US006626662B2

(12) United States Patent
Ramesohl et al.

(10) Patent No.: US 6,626,662 B2
(45) Date of Patent: Sep. 30, 2003

(54) SYSTEM FOR MANUFACTURING CEMENT CLINKER

(75) Inventors: Hubert Ramesohl, Bergisch Gladbach (DE); Carsten Eckert, Cologne (DE)

(73) Assignee: KHD Humboldt Wedag AG, Cologne (DE)

( * ) Notice: Subject to any disclaimer, the term of this patent is extended or adjusted under 35 U.S.C. 154(b) by 0 days.

(21) Appl. No.: 10/348,829

(22) Filed: Jan. 22, 2003

(65) Prior Publication Data
US 2003/0143508 A1 Jul. 31, 2003

(30) Foreign Application Priority Data

Jan. 25, 2002 (DE) .......................................... 102 02 776

(51) Int. Cl.[7] ................................................ C04B 2/10
(52) U.S. Cl. ......................................... 432/58; 106/739
(58) Field of Search ............................. 432/14, 15, 58; 106/713, 716, 739, 752, 758, 762, 771; 110/246, 346

(56) References Cited

U.S. PATENT DOCUMENTS 3,584,850 A * 6/1971 Brandvold et al. ......... 106/753
4,425,092 A * 1/1984 Brachthauser et al. ...... 432/106
5,614,016 A * 3/1997 Hundeb.o slashed.l ...... 106/745
6,142,771 A * 11/2000 Doumet ........................ 432/14

* cited by examiner

Primary Examiner—Gregory Wilson
(74) Attorney, Agent, or Firm—Sonnenschein Nath & Rosenthal LLP

(57) ABSTRACT

In order to provide a cement clinker production line with a calcinator connected to the rotary kiln and including a separate rotary drum-type reactor with the objective to safely burn even coarse secondary fuels in the drum-type reactor and also to evenly and effectively transfer the released heat energy to the cement raw meal, it is proposed in accordance with the invention to introduce into the rotary drum-type reactor on the inlet side for the solids a partial stream line of the tertiary air guided from the clinker cooler to the calcinator, a highly ignitable fuel, the low ignitable or low flammable secondary fuel and a partial stream line for the cement raw meal and to connect the exit side for the material on the rotary drum-type reactor via a line for carrying out the solid residues to the tertiary air channel and/or the rotary kiln exit gas channel of the calcinator and/or to the inlet chamber of the rotary kiln.

14 Claims, 3 Drawing Sheets

SYSTEM FOR MANUFACTURING CEMENT CLINKER

BACKGROUND OF THE INVENTION

The invention relates to a system for manufacturing cement clinker from cement raw meal with a cyclone suspension-type heat exchanger system for preheating the raw meal, with a precalcination stage supplied with fuel and with tertiary air from the clinker cooler, with a sintering stage in the form of a rotary kiln and with the clinker cooler connected on the downstream side of the material flow, and with a rotary drum-type reactor for carbonizing/burning secondary fuels where the carbonization gases/combustion gases are introduced into the calcinator and the solid residues of the reactor are utilized in the cement clinker production line.

A cement clinker production line is known from document EP-A-0 764 614 with a separate shaft gasifier installed adjacent to the calcination system which is used as a secondary reactor, where coarse waste materials, especially used tires are gasified. The shaft gasifier is loaded from the top with the used tires and with a portion of the tertiary air coming from the clinker cooler as a gasification medium. The product gas generated in the shaft gasifier is introduced into the calcinator as fuel gas, and the residues of the used tires gasified in the shaft gasifier are transported to the inlet shaft of the rotary kiln by means of a mechanical push-off system. The gasification process in the shaft gasifier can be subject to considerable fluctuations because the used tires stacked in the shaft gasifier are not rearranged during the thermal treatment. No raw meal is introduced into the shaft gasifier where the waste materials, especially used tires are thermally treated.

A cement clinker production line is known from document WO 01/09548 where a separate reactor is installed adjacent to its calcinator. Said reactor is also loaded from the top with waste materials which are burned in the reactor with tertiary air from the clinker cooler. A partial stream of the cement raw meal is also introduced into the reactor from the top. The waste materials and the partial stream of raw meal are deposited in the combustion reactor on a rotating disk installed above the reactor bottom. By means of rotating the disk, the thermally treated solids are transferred outward and into the calcinator or the inlet of the rotary kiln. The combustion gas is also introduced into the calcinator. In said combustion reactor, the waste materials, especially coarse waste materials, are also not mixed so that uniform combustion conditions and thus a uniform raw meal precalcination cannot be expected.

According to document DE-C-35 33 775 in a system for manufacturing cement clinker from raw meal where waste materials having a calorific value are utilized, it is known to introduce the waste materials after they have been dried into a carbonizer operated by means of exit gas from the rotary kiln and a partial stream of the tertiary air for pyrolysis or for partially burning the waste materials, to introduce the pyrolysis gas into the calcinator and to treat and homogenize the solid pyrolysis residue and introduce it at least partially into the rotary kiln. In this case, the waste material carbonizer can also be configured as a rotary kiln. An introduction of cement raw meal into the carbonizer does not take place.

From documents DE-A-33 20 670, DE-A-34 11 144 and DE-A-35 20 447 in a system for manufacturing cement clinker where the waste materials having a calorific value are utilized, it is also known to carbonize or burn said waste materials in a separate rotary kiln and to use the carbonization gas/exit gas for the thermal treatment of the raw meal. However, no cement raw meal of any kind is introduced into the carbonizer/combustion furnace.

In the carbonization/burning of waste materials, however, especially coarse waste materials in a rotary kiln, it is difficult to provide uniform conditions for the thermal treatment, especially preventing temperature peaks which can lead to the baking on of solids in the rotary kiln, which is undesirable.

SUMMARY OF THE INVENTION

The object of the invention is to provide a cement clinker production line of the above described type with a calcinator connected to the rotary kiln and including a rotary drum-type reactor with the objective to safely burn even coarse secondary fuels, even including varying types and sizes, in the drum-type reactor and also to allow transferring the released heat energy evenly and effectively to the cement raw material, i.e., to be able to safely dispose of residues and produce cement clinker with favorable heat economics in one single integrated cement clinker production line.

First, the system of the invention for manufacturing cement clinker with a rotary drum-type reactor integrated in the calcination stage for carbonizing/burning and thus disposing of inert secondary fuels is characterized in that other than the secondary fuels and other than the partial stream of tertiary air coming from the clinker cooler, a partial stream of the cement raw meal also leads into the inlet opening for the material in the rotary drum-type reactor, especially preheated raw meal, which is related at least to the following advantages:

In the rotary drum-type reactor, the secondary fuel and the raw meal, which may already be very hot when it is introduced, are continuously circulated and mixed. As a result, the secondary fuels can be evenly distributed and effectively converted into the conversion products. The released heat energy is then transferred at least in part inside the rotary drum-type reactor directly and evenly to the partial stream of raw meal, which can then undergo a high-grade calcination at least in part inside the drum already, provided that the temperature in the rotary drum-type reactor is maintained at a level of at least approximately 800 to 850° C. The thorough mixing of the carbonizing/burning secondary fuels, such as whole used tires, and the raw meal opens up the possibility of oxidizing the secondary fuels flameless so that no temperature peaks occur in the rotary drum, thereby minimizing the risk of solids baking on in the rotary drum. Moreover, with the quantity of raw meal added to the rotary drum-type reactor the temperature in the reactor can be controlled such that a melting phase of the solids is not produced. To this aim, even a partial stream of raw meal which is not preheated can be introduced into the rotary drum-type reactor. Also, there is a possibility that beginning in the rotary drum-type reactor already, certain pollutants of the secondary fuels are bound to the reactive cement raw meal.

It is also possible to provide the inside cover of the rotary drum-type reactor with lifting elements.

The exit side for the solids on the rotary drum-type reactor is connected to the tertiary air channel ascending from the bottom to the top and/or the rotary kiln exit gas channel of the calcinator by means of a line for discharging the carbonization gas/combustion gas-solids mixture, where the solids mixture consists of the solid residue of combustion, such as slag and the raw meal, which may be precalcinated.

Coarse residues from the rotary drum-type reactor which cannot be pneumatically transported upward by the suspension flowing from the bottom to the top in the calcinator are introduced into the material inlet of the rotary clinker kiln and integrated into the clinker in the rotary clinker kiln so that the entire process produces no residues.

It is also possible, however, to introduce the mixture of solids exiting the rotary drum-type reactor, at least the coarse-grained components, directly into the inlet chamber of the rotary clinker kiln and/or directly into the clinker cooler.

Additionally, an igniter or starter burner can be inserted in the inlet side for the solids on the rotary drum-type reactor. Said starter burner is supplied with an easily ignitable fuel so as to start the rotary drum-type reactor. The exit gases of the rotary drum-type reactor are guided either as flue gas from the combustion or alternatively as combustible gas from the pyrolysis/carbonization of the secondary fuels into the calcinator and/or into the ascending line between the inlet chamber of the rotary kiln and the calcinator where they are used for further precalcination of the cement raw meal.

Furthermore, a partial stream of the exit gas from the rotary kiln containing pollutants can also be introduced into the rotary drum-type reactor. Said pollutants at least in part can be decomposed by and/or attached to the hot solids in the rotary drum-type reactor. The pollutants of the bypass gas can also be dioxins and/or furans, etc.

BRIEF DESCRIPTION OF THE DRAWING

The invention and its other features and advantages are explained by means of the schematic exemplary embodiment shown in the drawing, as follows.

All identical parts of the systems in FIGS. 1 to 3 have the same reference numbers.

DETAILED DESCRIPTION OF THE PREFERRED EMBODIMENT

Figure 1:
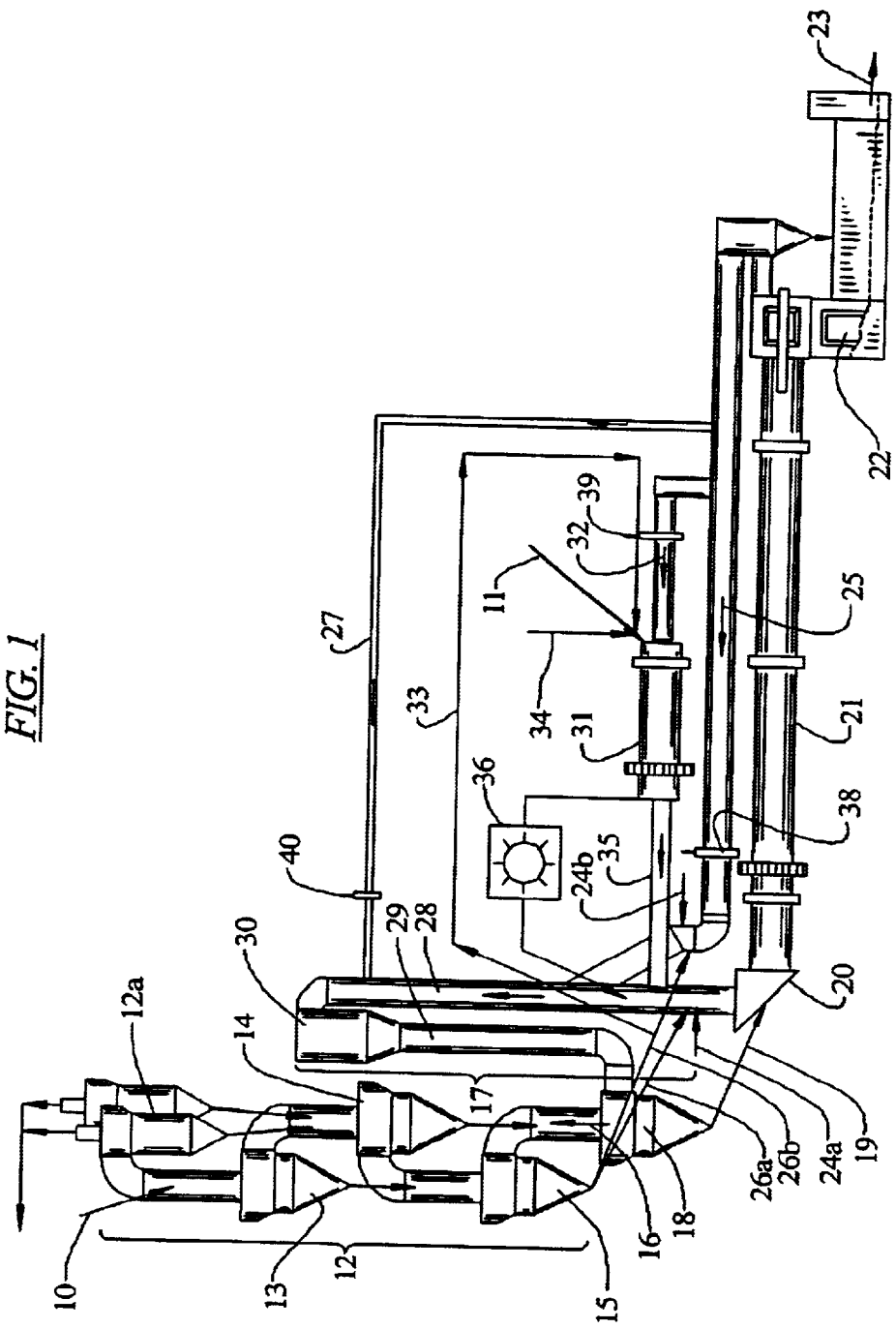
FIG. 1 illustrates a first embodiment of the cement clinker production line of the invention with integrated utilization/disposal of secondary fuels.

FIG. 1 shows a diagram of a system for manufacturing cement clinker from cement raw meal 10 with integrated utilization/disposal of secondary fuels 11.

The cement raw meal 10 is loaded from the top into the preheating stage 12 configured as a cyclone suspension-type heat exchanger system where it successively passes through the cyclone stages 12a, 13, 14, 15 in combined co-flow/counterflow with the hot exit gas 16 of a precalcination stage 17. It is separated in the bottom-most cyclone 18 from the stream of hot exit gas 16 and introduced as high-grade (for example 95%) calcinated cement raw meal 19 into the inlet chamber 20 of the rotary kiln 21 where it is burned in the sintering zone into cement clinker which is subsequently cooled in a clinker cooler 22, for example a grid-type cooler. The cooled cement clinker exits the cooler 22 at 23.

In the precalcination stage 17 supplied with fuel 24a, 24b and tertiary air 25 from the clinker cooler 22, the preheated cement raw meal 26a, 26b exiting the second-lowest cyclone stage 15 undergoes high-grade calcination. The fuel 24a can then advantageously be burned hypostoichiometrically at least at one so-called $DeNo_x$ burning site in the ascending line for the exit gas coming from the rotary kiln 21 so as to generate a CO-containing reduction zone for reducing the pollutant $NO_x$ contained in the exit gas from the rotary kiln, while the fuel 24b in the tertiary air 25 coming from the clinker cooler is advantageously burned hyperstoichiometrically. The residual burn-out of the excess CO remaining in the $NO_x$ reduction zone and possibly unburned hydrocarbons can take place by means of oxygen from excess tertiary air 25 and possibly from another partial stream of tertiary air branched off via the partial stream line 27 for tertiary air from the tertiary air line 25 and guided to an area of the calcination stage 17 at a higher elevation. For purposes of thoroughly mixing the reaction components, a whirl chamber or mixing chamber 30 can be disposed in the area of the flow diversion of the gooseneck-shaped precalcination stage 17 from the ascending pipe branch 28 by approx. 180° into the descending pipe branch 29, where the gas-solids suspension is thoroughly mixed and resulting in a full residual burnout of the fuel components which may not have burned in the descending branch 29 of the precalcination stage 17.

The secondary fuels 11 which may also be coarse fuels, such as car tires, large pieces of wood, canisters, etc., are loaded on the inlet side for solids of a rotary drum-type reactor 31, which is especially disposed only on two roller stations. Another tertiary air branch line 32 branched off from the tertiary air line 25 also enters said same inlet side as well as, in accordance with the invention, a cement raw meal branch line 33 from the raw meal preheater 12. In order to start the reaction in the rotary drum-type reactor 31, an easily ignitable fuel 34 is inserted whose combustion ignites the inert secondary fuel 11, which is then gasified or burned depending upon the supplied quantity of tertiary air 32 in the rotary drum-type reactor 31. The rotation of the rotary drum-type reactor 31 achieves a constant circulation of the solids, a good mixing of the secondary fuels 11 with the partial stream of cement raw meal 33 and a uniform heat transfer and the related precalcination of said partial stream of raw meal. The quantity of the partial stream of cement raw meal 33 introduced into the rotary drum-type reactor 31 provides an effective temperature control for said reactor, including a control aiming at preventing the production of melting phases and deposits in the rotary drum-type reactor.

It is also possible to premix the secondary fuel 11 and the partial stream of raw meal 33 in a preceding unit before they are introduced into the rotary drum-type reactor.

At the delivery side for the solids on the rotary drum-type reactor 31 the carbonization gas/combustion gas-solids mixture is removed via the line 35. The solids are a mixture of solid residues from the carbonization/combustion, such as slag, and precalcinated cement raw meal. The coarser components of said mixture of solids can be introduced into the inlet chamber 20 of the rotary kiln via the ascending line for exit gas from the rotary kiln, possibly after passing a crusher 36, while the carbonization gas/combustion gas and the fine-grained components of the solids mixture that is carried out, especially the partial stream of raw meal 33 thermally treated in the reactor 31, can be introduced via the line 35 directly into the ascending branch 28 of the precalcination stage 17.

It is especially advantageous to install the rotary drum-type reactor 31 for carbonizing/burning the secondary fuels 11 parallel to and above the rotary clinker kiln 21 and in the area of the precalcinator 17. This produces relatively short connections between the rotary drum-type reactor 31 and the precalcinator 17 and the inlet chamber 20 of the rotary kiln, and because of the respective height level where the rotary drum-type reactor 31 is positioned, the raw meal can be supplied into the drum-type reactor and the solids can be carried out of the drum-type reactor without separate conveyor systems, simply by transportation by force of gravity.

In order to control the cement clinker production line, especially for distributing the combustion air streams, controlling devices 38, 39, 40 are installed in the tertiary air line 25 and in its branch lines 32 and 27.

Figure 2:
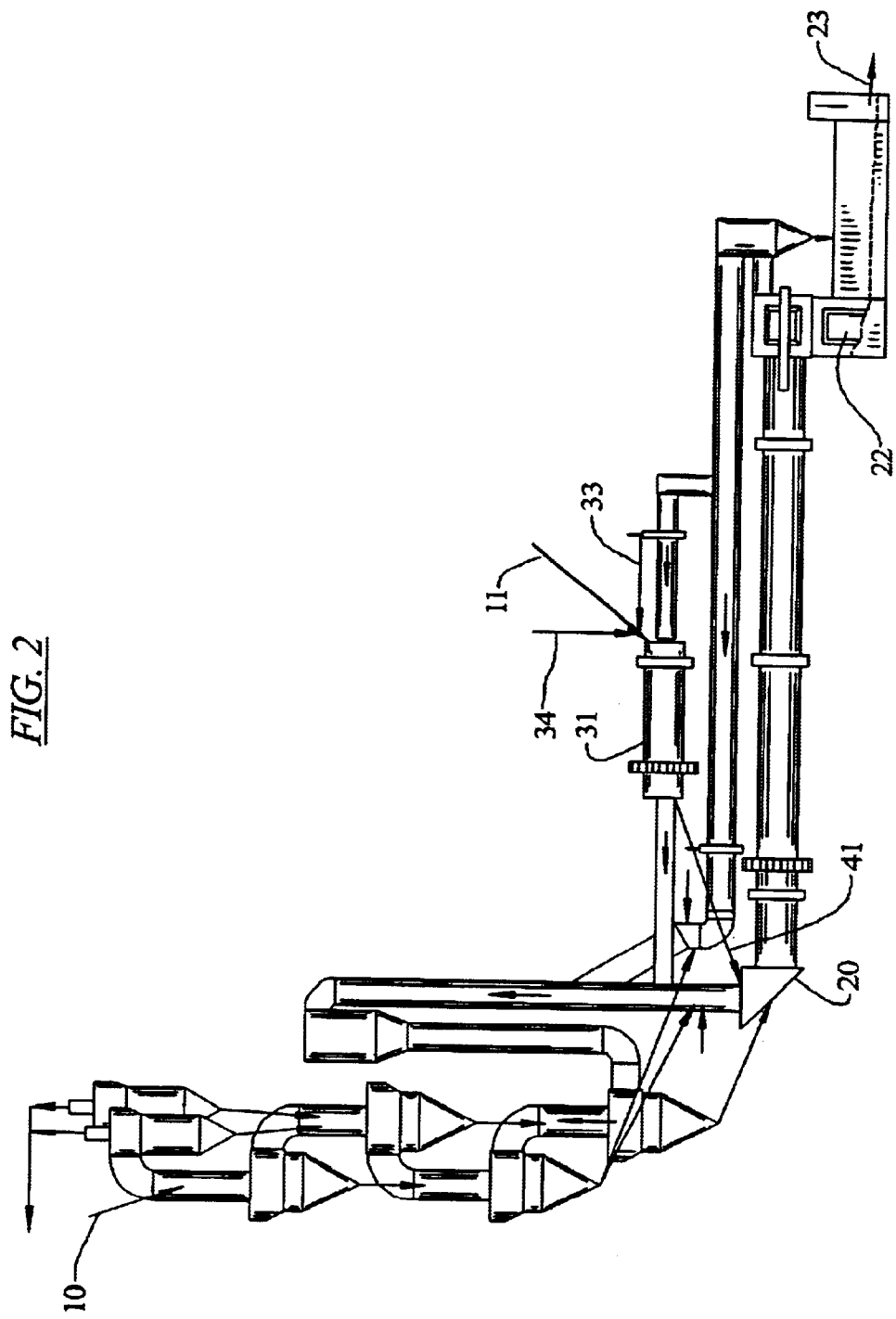
FIG. 2 illustrates a second embodiment of the system of FIG. 1.

FIG. 2 differs from FIG. 1 in that the solid residues, for example the slag carried out of the rotary drum-type reactor 31 is introduced via the line 41 directly into the inlet chamber 20 of the rotary kiln.

Figure 3:
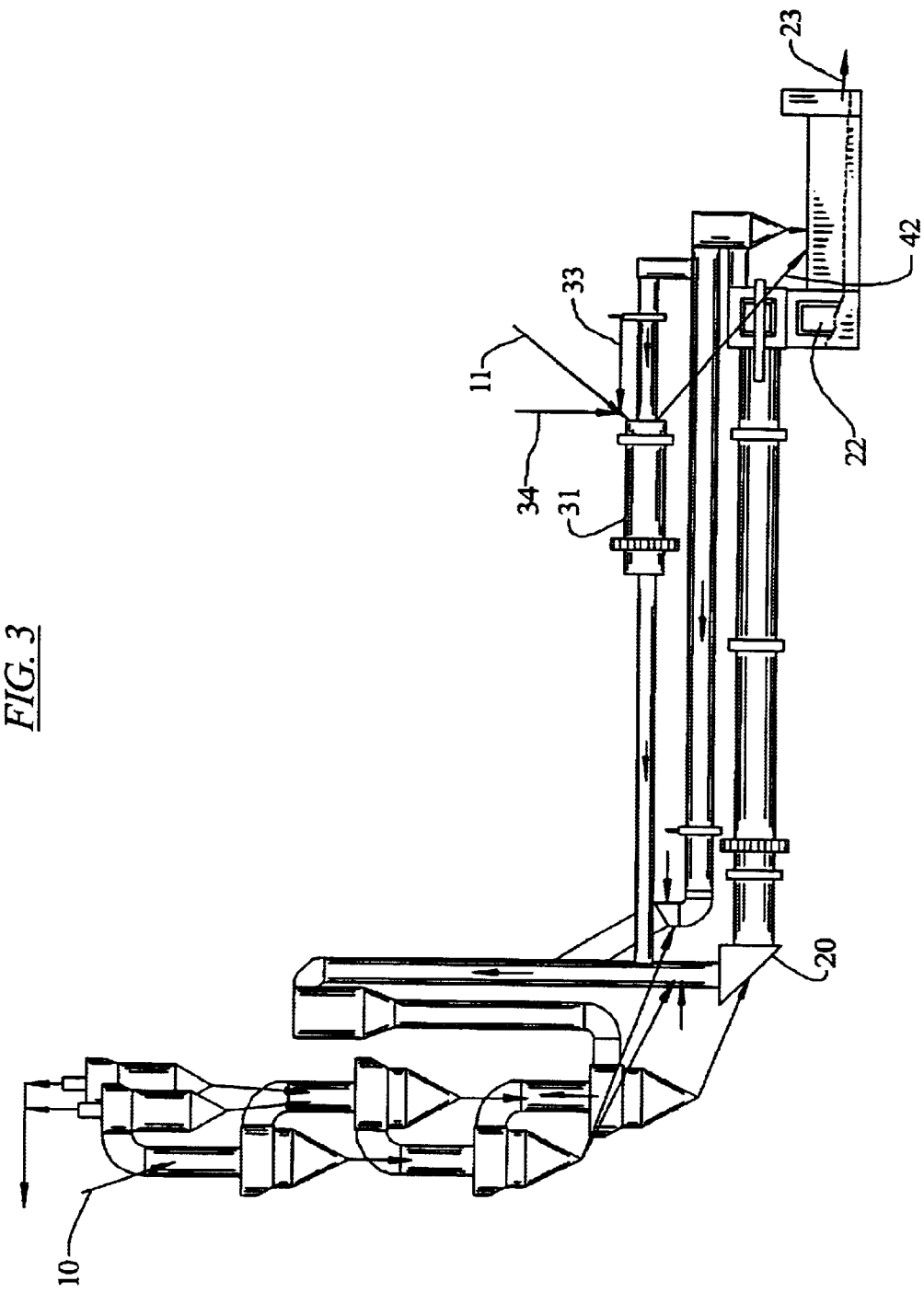
FIG. 3 illustrates a third variant of the system of FIG. 1.

In the exemplary embodiment of FIG. 3, the solid residues, for example the slag carried out of the rotary drum-type reactor 31 is introduced via the line 42 directly into the clinker cooler 22, i.e. said slag is added directly to the cement clinker before the clinker is ground into cement.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A system for manufacturing cement clinker from cement raw meal with a cyclone suspension-type heat exchanger system as a preheater for the raw meal, with a precalcination stage supplied with fuel and tertiary air through a tertiary airline from a clinker cooler, with a sintering stage in the form of a rotary kiln and with the clinker cooler connected on a downstream side of the rotary kiln, and with a rotary drum-type reactor for carbonizing/burning secondary fuels, where the carbonization gases/combustion gases are introduced into the precalcination stage and solid residues of the reactor are utilized in a cement clinker production line, comprising:
    a partial stream line of the tertiary air guided from the clinker cooler to the calcinator, a highly ignitable fuel, the low ignitable or low flammable secondary fuel and a partial stream line for the cement raw meal leading into the rotary drum-type reactor on an inlet side for the solids, and
    a delivery side for the material on the rotary drum-type reactor being connected via a line for carrying out the solid residues to one of a tertiary air channel ascending from a bottom to a top, a rotary kiln exit gas channel of the calcination stage, an inlet chamber of the rotary kiln and an inlet chamber of the clinker cooler.

2. The system as defined in claim 1, wherein the partial stream line for the cement raw meal is branched off from a stream of preheated raw meal leaving the raw meal preheater and entering the precalcination stage.

3. The system as defined in claim 1, wherein the rotary drum-type reactor for carbonizing/burning the secondary fuels is installed parallel to and above the rotary kiln.

4. The system as defined in claim 1, wherein the rotary drum-type reactor is disposed on two roller stations.

5. The system as defined in claim 1, wherein an inside cover of the rotary drum-type reactor is provided with lifting elements.

6. The system as defined in claim 1, wherein from the tertiary air line another partial stream line of tertiary air is branched off bypassing the rotary drum-type reactor and leading into an area of the calcinator positioned at a higher level.

7. The system as defined in claim 1, wherein a pollutant-containing partial stream of an exit gas from the rotary kiln is also introduced into the rotary drum-type reactor for utilizing/disposing the secondary fuels.

8. A system for manufacturing cement clinker from cement raw meal comprising:
    a cyclone suspension-type heat exchanger system as a preheater for the raw meal,
    a sintering stage in the form of a rotary kiln and with a clinker cooler connected on a downstream side of the rotary kiln,
    a precalcination stage supplied with fuel and with tertiary air through a tertiary air line from the clinker cooler,
    a rotary drum-type reactor for carbonizing/burning secondary fuels having an inlet side and a delivery side, where carbonization gases/combustion gases from the carbonizing/burning of the secondary fuels are introduced into the precalcination stage and solid residues from the reactor are utilized in the system,
    a partial stream line of the tertiary air guided from the clinker cooler to the precalcination stage connected to the inlet side of the reactor,
    a highly ignitable fuel supplied on the inlet side of the reactor,
    the secondary fuel supplied on the inlet side of the reactor, and
    a partial stream line for the cement raw meal leading into the inlet side of the reactor, and
    the delivery side of the reactor connected via a line for carrying out the solid residues to at least one of a group consisting of a tertiary air channel ascending from a bottom to a top, a rotary kiln exit gas channel of the precalcination stage, an inlet chamber of the rotary kiln and an inlet chamber of the clinker cooler.

9. The system as defined in claim 8, wherein the partial stream line for the cement raw meal is branched off from a stream of preheated raw meal leaving the raw meal preheater and entering the precalcination stage.

10. The system as defined in claim 8, wherein the rotary drum-type reactor for carbonizing/burning the secondary fuels is installed parallel to and above the rotary kiln.

11. The system as defined in claim 8, wherein the rotary drum-type reactor is disposed on two roller stations.

12. The system as defined in claim 8, wherein an inside cover of the rotary drum-type reactor is provided with lifting elements.

13. The system as defined in claim 8, wherein from the tertiary air line another partial stream line of tertiary air is branched off bypassing the rotary drum-type reactor and leading into an area of the precalcination stage positioned at a higher level.

14. The system as defined in claim 8, wherein a pollutant-containing partial stream of exit gases from the rotary kiln is also introduced into the rotary drum-type reactor for utilizing/disposing the secondary fuels.

* * * * *